Nov. 22, 1938.  C. F. RUBSAM  2,137,415

BALANCING MEANS FOR AUTOMOBILE WHEELS

Filed Dec. 14, 1934

INVENTOR
Charles F. Rubsam
BY Justin W. Macklin
ATTORNEY

Patented Nov. 22, 1938

2,137,415

UNITED STATES PATENT OFFICE 2,137,415

BALANCING MEANS FOR AUTOMOBILE WHEELS

Charles F. Rubsam, Jackson, Mich.

Application December 14, 1934, Serial No. 757,542

4 Claims. (Cl. 301—5)

The objects of the present invention include the provision of a cheaply manufactured means for balancing automobile wheels, particularly for counterbalancing the tire valve parts, and which may be detachable and yet which when fixed in position shall be securely held against accidental displacement.

In some instances irregularities in the wheel and particularly in the tire itself require counterbalancing or equalizing to secure most satisfactory wheel balance.

In the use of any of the forms of my invention one important object which I have attained is that of very quick application and removal.

The above and other objects will be made more clear in the following description which relates to the accompanying drawing. The essential characteristics of my invention are summarized in the appended claims.

Figure 1:
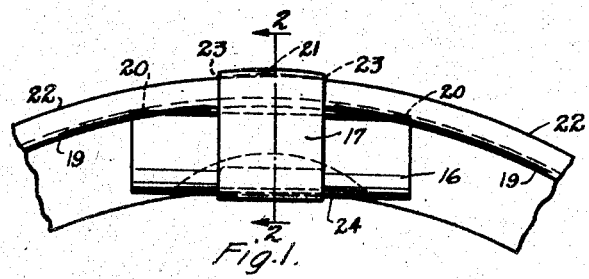
Fig. 1 is a view in side elevation of the device shown in place on the rim of a wheel.

In the construction shown in the drawing a balance weight 16 is held by a clip 17 which is preferably made from spring steel. The rim flange 18 is provided with a turned down lip 19. The weight 16 is cut from straight bar and when placed against the rim flange 18, which is curved circumferentially, and underneath the turned down lip 19 which follows the same formation, it will grip the rim underneath said turned down lip 19 as indicated by 20, at both of its ends. The clip 17 being made at a slightly more pronounced curvature than that of the rim, as shown at 21, will grip the crown 22 of the rim at both of its ends, as at 23. The weight 16 is provided with a slot 24 to permit the bent over end portion of clip 17 to enter said slot as at 25. This locks the clip in the weight 16 and, as the clip 17 is made from spring steel, it pulls the weight into the concave formation underneath the rim flange 18 as shown in Fig. 1.

Figure 2:
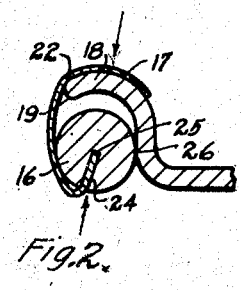
Fig. 2 is a sectional view taken on the line 2—2 of Fig. 1, looking in the direction indicated by the arrows.
Figure 3:
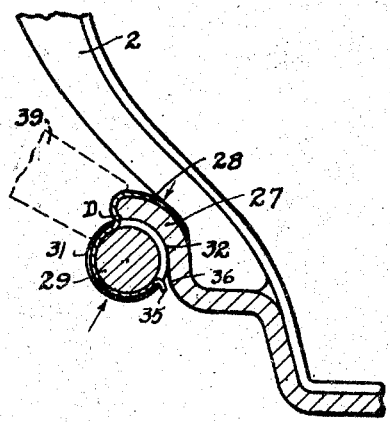
Fig. 3 is a sectional view of a balance weight secured by a similar strip and showing a drop center rim.

The clip 17 engaging the crown of the rim flange as shown in Fig. 2 causes a pull in the direction of the two arrows shown in Fig. 2. This pull forces the weight 16 tight against the rim wall as at 26, due to the pressure exerted by weight 16 against the turned down rim lip 19 as at both ends 20 of the weight. This grips the weight tight underneath and against the rim flange and needs no additional holding of clip 17 by the tire pressure.

In Figs. 3, 4, 5 and 6 the rim flange 27 has no pronounced turned down lip. The spring clip 28 holds a weight 29. The latter has a reduced portion 30 forming a recess in the center, which receives the clip 28 therein, whereby the clip and weight are secured together as a unit. The clip 28 is turned inwardly and downwardly at the edge of the rim flange 27, to form a recess as shown at D. This curvature of the clip 28 causes the pull of the clip, being made from spring steel, to act in the direction of the two arrows shown in Fig. 3. This pull locks the weight 29 tight, as explained in regard to the weight 16 in Fig. 1, because the two ends 31 of the straight weight 29 grip the concave formation underneath the rim flange and pull it tight against the rim wall, as indicated at 32 in Fig. 3. The more pronounced curvature of the clip 28 grips the crown 34 of the rim at both sides as at 33. The end lip 35 of clip 28 comes close enough to the rim wall 36 to leave a slight space so the clip's pulling action will not be interfered with. Should the clip however tend to move upwardly over the rim crown 34, the end lip 35 would block such movement by contacting with the rim wall 36. In this way the clip will not be able to come off, being held by the pulling action in the direction of the two arrows shown in Fig. 3. The weight 29 is held in clip 28 in assembled position, due to the fact that the shape 37 extends to over one hundred eighty degrees as indicated by the two lines of 38. This permits the weight to be initially snapped into assembled position in the clip 28 before being applied to the rim.

Figure 4:
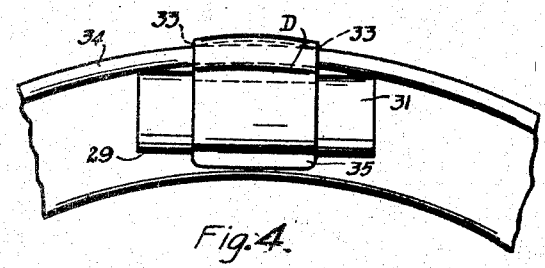
Fig. 4 is a view in side elevation of the same.
Figure 5:
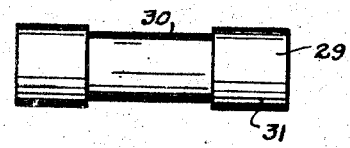
Fig. 5 is a side view of the weight of Figs. 3 and 4.
Figure 6:
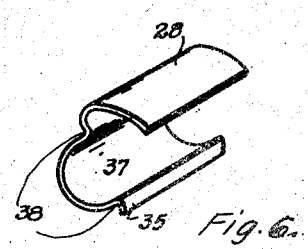
Fig. 6 is a perspective view of the securing strap of Figs. 3 and 4.

Fig. 5 shows a longer weight than that of Fig. 4, indicating that different weights, heavier or lighter, can be applied to clip 28 to properly balance the wheel. The tool 39 can be used to apply the clip.

It will be understood that details of the construction illustrated may be altered and varied without departing from the spirit of this invention, as defined by the following claims.

Having thus described my invention, what I claim is:

1. A balancing device adapted to be fitted between a pneumatic tire and rim of an automobile wheel and project outwardly and over the edge of the rim flange, and having a portion bent upon itself and adapted to carry a weight element, the device being adapted to be placed in any circumferential position to balance the wheel and to be held by its resilient gripping action on the flange and by tire pressure against the portion between the tire and rim flange, there being also sharp corners on the weight to resist slipping circumferentially.

2. The combination with a pneumatic tire rim having an outwardly curved flange adapted to receive the bead portion of the tire, of a flat metal strip having a portion curved to fit a tire side of the flange and extend radially inwardly and then to curve inwardly toward the rim, of a weight member having a reduced portion embraced by the strip and being pressed inwardly toward the outward concave surface of the rim flange.

3. A balancing instrumentality of the type described for a wheel having a tire carrying rim with an outwardly extending flange comprising a spring clip and a weight carried by the clip, one end of the clip elastically embracing a major portion but not all of the circumference of said weight to retain said weight and clip in assembled relation, the other end of said clip defining a lip overhanging at least a portion of the circumference of said weight not embraced by said clip, said lip being spaced from said weight to form a channel for elastically receiving said flange, whereby said lip elastically engages said flange and said balancing instrumentality is secured to said flange.

4. A balancing device for attachment to the rim of a pneumatic tired automobile wheel having an outwardly curved flange, comprising a spring clip having an inner end portion shaped to substantially conform to the cross-sectional curvature of the tire side of the rim flange and extend between the flange and tire wall, said clip being shaped to extend around and snugly embrace the edge of the rim flange, and a weight member having a shallow recess therein, the outer end portion of said clip being received in said recess with one side of said portion resting against the bottom of the recess and the opposite side exposed, said clip and weight being secured together to form a unit.

CHARLES F. RUBSAM.